United States Patent [19]
Yip

[11] Patent Number: 5,970,860
[45] Date of Patent: Oct. 26, 1999

[54] FOOD PROCESSOR

[76] Inventor: Chung Lun Yip, 3rd Floor, Blocks A & C, King Yip Factory Building, No. 59 King Yip Street, Kwun Tong, Kowloon, The Hong Kong Special Administrative Region of the People's Republic of China

[21] Appl. No.: 09/227,584

[22] Filed: Jan. 8, 1999

[51] Int. Cl.⁶ .......................... A47J 43/00; A47J 43/044; A47J 43/25; A47J 44/00
[52] U.S. Cl. ................................. 99/510; 99/495; 241/93; 241/169.1; 248/205.8; 248/362; 248/683
[58] Field of Search .................... 99/495, 492, 510–513; 241/92, 93, 169.1, 37.5, 282.1, 101.1; 248/683, 467, 362, 206.3, 205.8, 205.9, 205.5, 176.1; 269/21; 366/197–199, 205, 306, 318, 601

[56] References Cited

U.S. PATENT DOCUMENTS

| | | | |
|---|---|---|---|
| 2,634,076 | 4/1953 | Van Dusen | 248/362 |
| 3,082,988 | 3/1963 | Holden | 248/205.8 |
| 4,081,145 | 3/1978 | Moe et al. | 241/93 |
| 4,325,643 | 4/1982 | Scott et al. | 366/200 |
| 4,620,476 | 11/1986 | Brym | 99/484 |
| 4,629,131 | 12/1986 | Podell | 241/37.5 X |
| 4,893,760 | 1/1990 | Boin et al. | 366/343 |
| 5,031,865 | 7/1991 | Blattner | 248/205.8 X |
| 5,104,077 | 4/1992 | Liu | 248/363 X |
| 5,423,466 | 6/1995 | Moon | 248/205.8 X |
| 5,762,305 | 6/1998 | Lee | 248/205.8 |
| 5,820,116 | 10/1998 | Haese | 269/21 |

Primary Examiner—Timothy Simone
Attorney, Agent, or Firm—Leydig, Voit & Mayer, Ltd.

[57] ABSTRACT

A food processor includes a food processing unit and a separate base for holding the food processing unit in position for operation. The food process unit and base have respective portions for releasable inter-connection. The base includes a bottom suction member for releasable attachment by suction onto a support surface and an internal locking member movable between a first position stretching the suction member and locking the food processing unit connected to the base and a second position for releasing the suction member and the food processing unit.

12 Claims, 4 Drawing Sheets

FOOD PROCESSOR

The present invention relates to a food processor and, particularly but not exclusively, to a meat mincer.

SUMMARY OF THE INVENTION

According to the invention, there is provided a food processor which comprises a food processing unit and a separate base for holding the food processing unit in position for operation, said food process unit and base having respective portions for releasable inter-connection, said base including a bottom suction member for releasable attachment by suction onto a support surface and an internal locking member movable between a first position stretching the suction member to perform said suction and locking the food processing unit connected to the base and a second position for releasing the suction member and the food processing unit.

Preferably, one of the portions is in the form of a recess for receiving the other portion in order to connect the food processing unit and the base together, and the locking member has a part for locking, in the first position, said other portion received in. said one portion.

More preferably, the recess is in the form of a channel having an open end for receiving said other portion through the open end as a slide fit, said recess and said other portion having inter-engageable formations on opposite sides.

It is further preferred that the part of the locking member is arranged to extend, in the first position, into the channel for locking said other portion received in the channel.

Preferably, the portion of the base is in the form of said recess.

In a preferred embodiment, the base includes a cam for rotation to move the locking member between the first and second positions.

More preferably, the locking member has an upper part for locking the food processing unit connected to the base and a lower part engaging behind the suction member for stretching the suction member to perform said suction action.

In a preferred specific construction, the locking member is in the form of a disc having a stem upstanding from the disc, said disc being the lower part and said stem having a free end providing the upper part.

More preferably, the stem is formed with an aperture within which the cam is positioned for operation.

Further more preferably, the aperture has a detent for detaining a protruding end of the cam in order to hold the locking member in the first position.

According to the construction, the base includes a shaft on which the cam is provided, said shaft being rotatable by means of a turning knob provided on the outside of the base.

In a specific preferred example, the food processing unit is a meat mincing unit.

Preferably, the meat mincing unit has a metering screw for driving meat forwards and includes co-operable rotary cutter and stationary apertured disc ahead for subsequently mincing the meat, said rotary cutter being rotatable with is the metering screw.

More preferably, the metering screw has a forward end provided with two off-centre studs and the rotary cutter has respective holes for engaging with the studs such that the rotary cutter is rotatable with the metering screw.

It is preferred that the apertured disc is held stationary by having four substantially equi-angularly spaced small protrusions around its periphery in engagement within an opening of the meat mincing unit.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
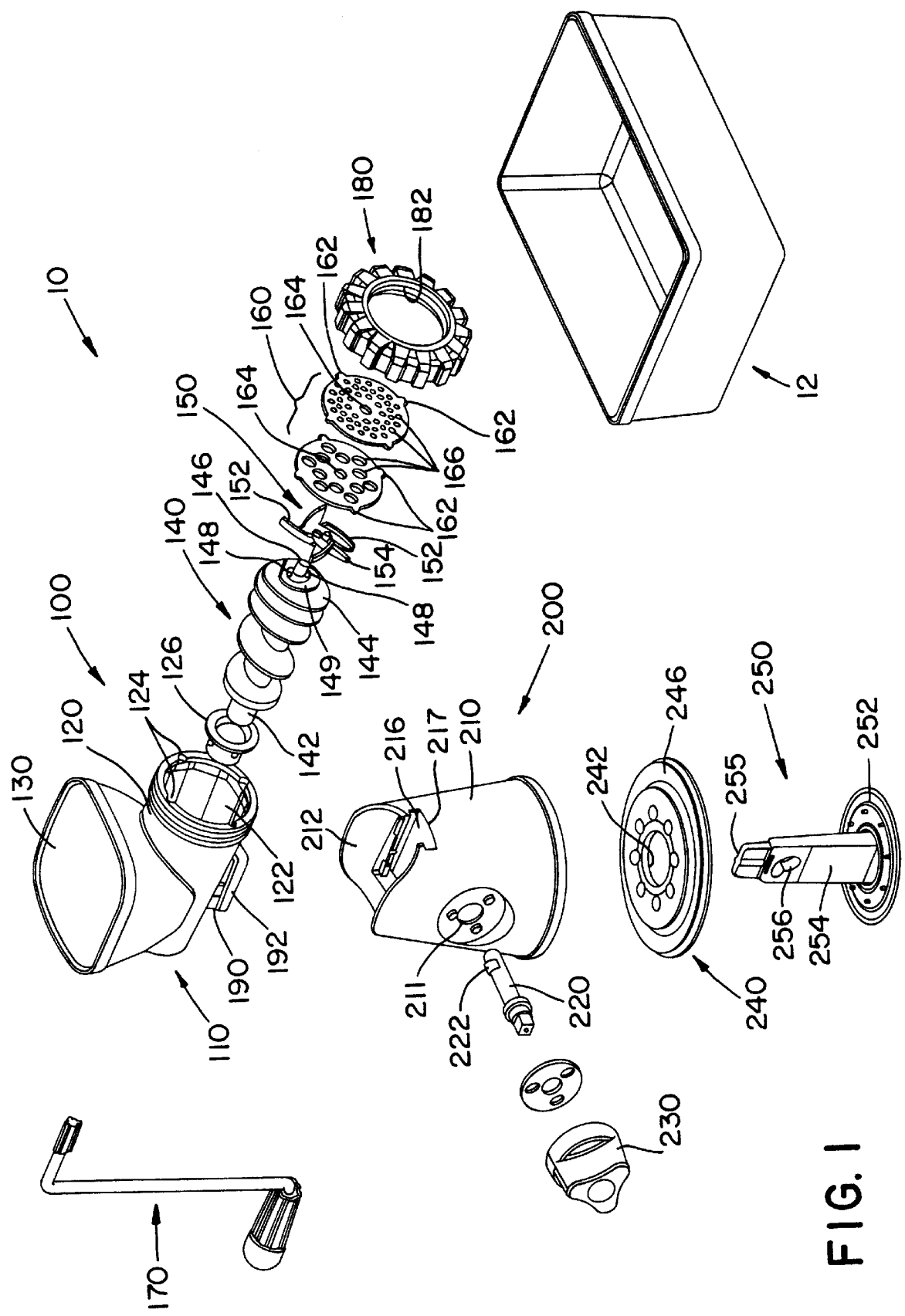
FIG. 1 is an exploded perspective view of an embodiment of a food processor in accordance with the invention, said processor having a food processing unit and a base for holding the food processing unit.

Referring to the drawings, there is shown a food processor, in the form of a meat mincer 10, embodying the invention, which mincer 10 comprises a mincing unit 100 and a separate base 200 for holding the mincing unit 100 in position for operation. The mincing unit 100 has a plastics body 110 integrally formed by a horizontal barrel 120 and a hopper 130 on top of the barrel 120. The barrel 120 has a front end opening 122, through which a plastics metering screw 140, a metal rotary cutter 150 and a stationary apertured metal disc 160 are inserted in that order into the barrel 120 and supported therein in a co-axial manner.

The metering screw 140 has a rear end 142 and includes a front end 144 bearing a central metal shaft 146. The rear end 142 is rotatably supported by means of a plastics coupler 126 provided at the rear end of the barrel 120. The coupler 126 is exposed through the barrel rear end and formed with a co-axial hole for the connection of a cranked handle 170 for rotating the metering screw 140. The front is end 144 includes a pair of off-centre metal studs 148 on opposite sides of the shaft 146, which are shorter than the shaft 146 and extend parallel thereto. A metal washer 149 is disposed around the shaft 146 and studs 148.

The rotary cutter 150 is generally flat and has a star-like shape having four equi-angularly spaced apart limbs providing respective cutting edges 152 on one side. The rotary cutter 150 is formed, in the central portion, with three holes 154 for fitting onto the shaft 146 and studs 148 respectively next to the washer 149, with the cutting edges 152 facing outwards, for rotation with the metering screw 140. The use of the two studs 148 for engaging the rotary cutter 150 for simultaneous rotation is relatively more cost-effective and stronger than the existing use of a non-circular section on the central shaft 146.

The metal disc 160 is flat and has a circular perimeter formed with four equi-angularly spaced small protrusions 162, each of which has a semi-circular shape. The barrel opening 122 has a circular inner periphery including four equi-angularly spaced, semi-circular small side recesses 124. The external profile of the disc 160 has the same shape as the internal profile of the opening 122 but is marginally smaller, in order for the disc 160 to be placed wholly within the opening 122 in a close fit manner and covering the rotary cutter 150. The engagement of the protrusions 162 with the respective recesses 124 prevents the disc 160 from being rotated relative to the barrel opening 122, at a strength comparatively larger than that could be provided by any known method.

The metal disc 160 is formed with a central hole 164 and a regular arrangement of sharp-edged cutting holes 166 all over. The central hole 164 serves to support the front end 144 of the metering screw 140 by the shaft 146. A plastics cap 180 is screwed onto the front end 122 of the barrel 120 for holding the disc 160 and the other components behind in position, said cap 180 having a central aperture 182 for exposing the disc holes 166. When the rotary cutter 150 is rotated with the metering screw 140 by means of the handle 170, its cutting edges 152 will sweep across the holes 166 of the disc 160 in order to perform a mincing action on meat pieces received via the hopper 130 and driven forwards by the metering screw 140.

The mincing unit body 110 includes a horizontal bottom portion 190 which has a pair of opposite side flanges 192 and a hollow lowermost side 194.

The base 200 has a frusto-conical plastics body 210 which has a top end providing a generally part-cylindrical seat 212 matching with and for receiving the mincing unit body 110 by the barrel 120 and includes a bottom end having a circular rim 214. At the bottom of the seat 212, a horizontal channel 216 having an open end 217 appearing on the outside of the body 210 is formed. The channel 216 has an upper side restricted by a pair of opposed ribs 218 leading to the open end 217, and includes a co-extending bottom slot 219. The channel 216 is designed to receive the bottom portion 190 of the mincing unit body 110 as a slide fit through the open end 217, for connecting the mincing unit 100 to the base 200, with the flanges 192 engaged by the respective ribs 218 and the hollow lowermost side 194 aligned with the bottom slot 219.

A U-shaped bracket 300 is formed inside the base body 210, depending integrally from the bottom of the channel 216. The bracket 300 has a pair of vertical side walls 302 in which a pair of aligned holes 304 is formed and includes a horizontal bottom wall 306 in which a central slot 308 is formed.

The base 200 includes a horizontal shaft 220 provided at its outer end with a turning knob 230 on the outside of the base body 210, a rubber suction disc 240 provided immediately underneath the body 210, and an internal locking member 250. The shaft 220 is rotatably supported by passing through a hole 211 on the side wall of the body 210 and then through the aligned side holes 304 of the bracket 300. Centrally between the bracket side walls 302, the shaft 220 is formed with a cam 222 having a protruding end 224. The suction disc 240 has a central aperture 242, a relatively larger flat central bottom recess 244, and a periphery 246 abutting with the body rim 214 from below.

The locking member 250 has a base disc 252 and a strip-like central stem 254 upstanding from the disc 252. The base disc 252 is close-fitted within the bottom recess 244 of the suction disc 240, with the stem 254 extending upwards through the aperture 242. The stem 254 extends further upwards through the bottom slot 308 of the bracket 300 to have an uppermost free end 255 reaching into the bottom slot 219 of the channel 216. Inside the bracket 300, the stem 250 is formed with an inverted-heart-shaped aperture 256 for the shaft 220 to also pass through, with the cam 222 positioned right therein. The aperture 256 has a horizontal upper side 257 and includes a small detent 258 in the form of a recess near the apex of the heart shape for detaining the end 224 of the cam 222 and a pointed portion 259 opposite the apex for abutment by the cam end 224.

Figure 2:
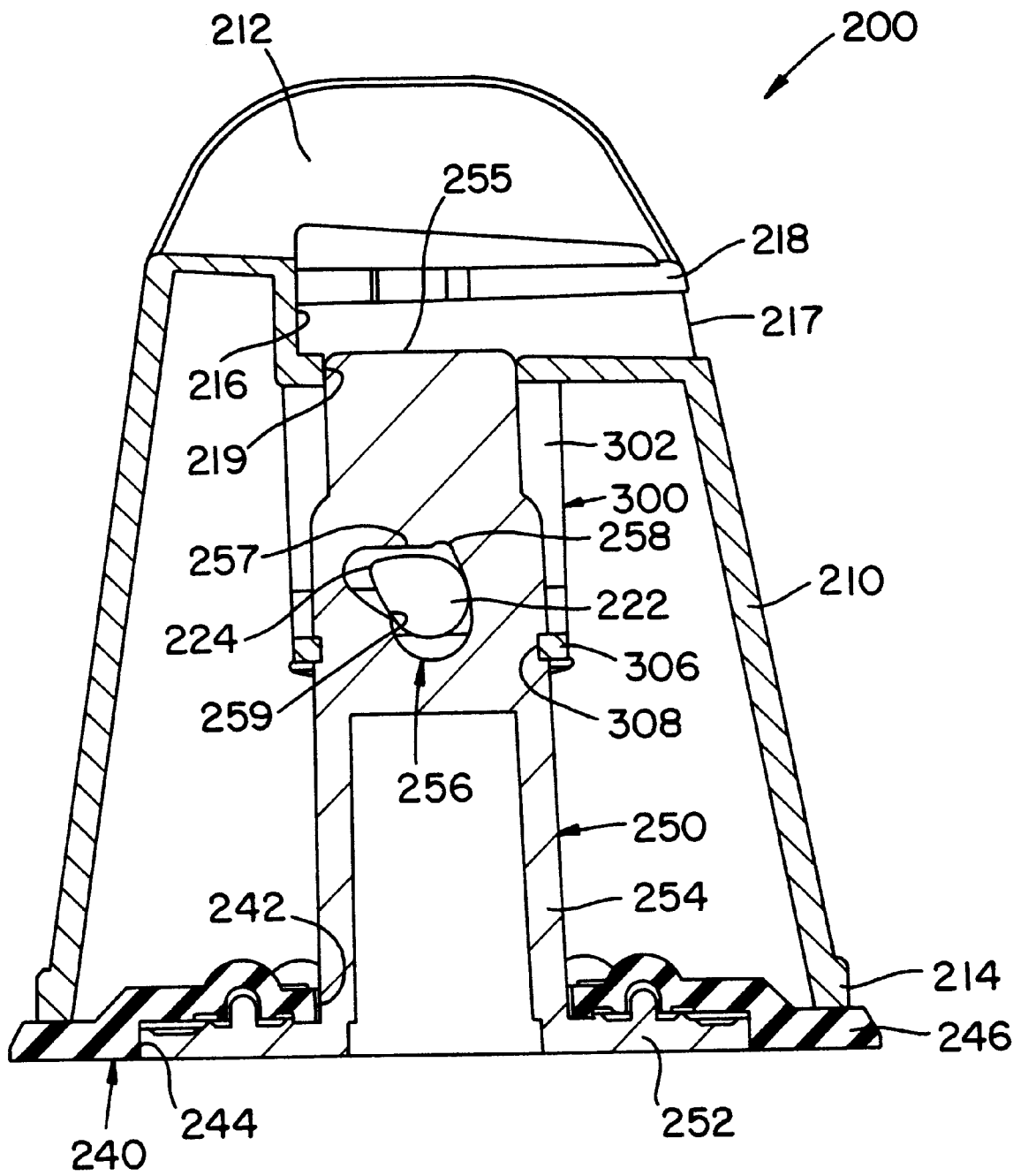
FIG. 2 is a cross-sectional front side view of the base of FIG. 1, in a released condition.
Figure 3:
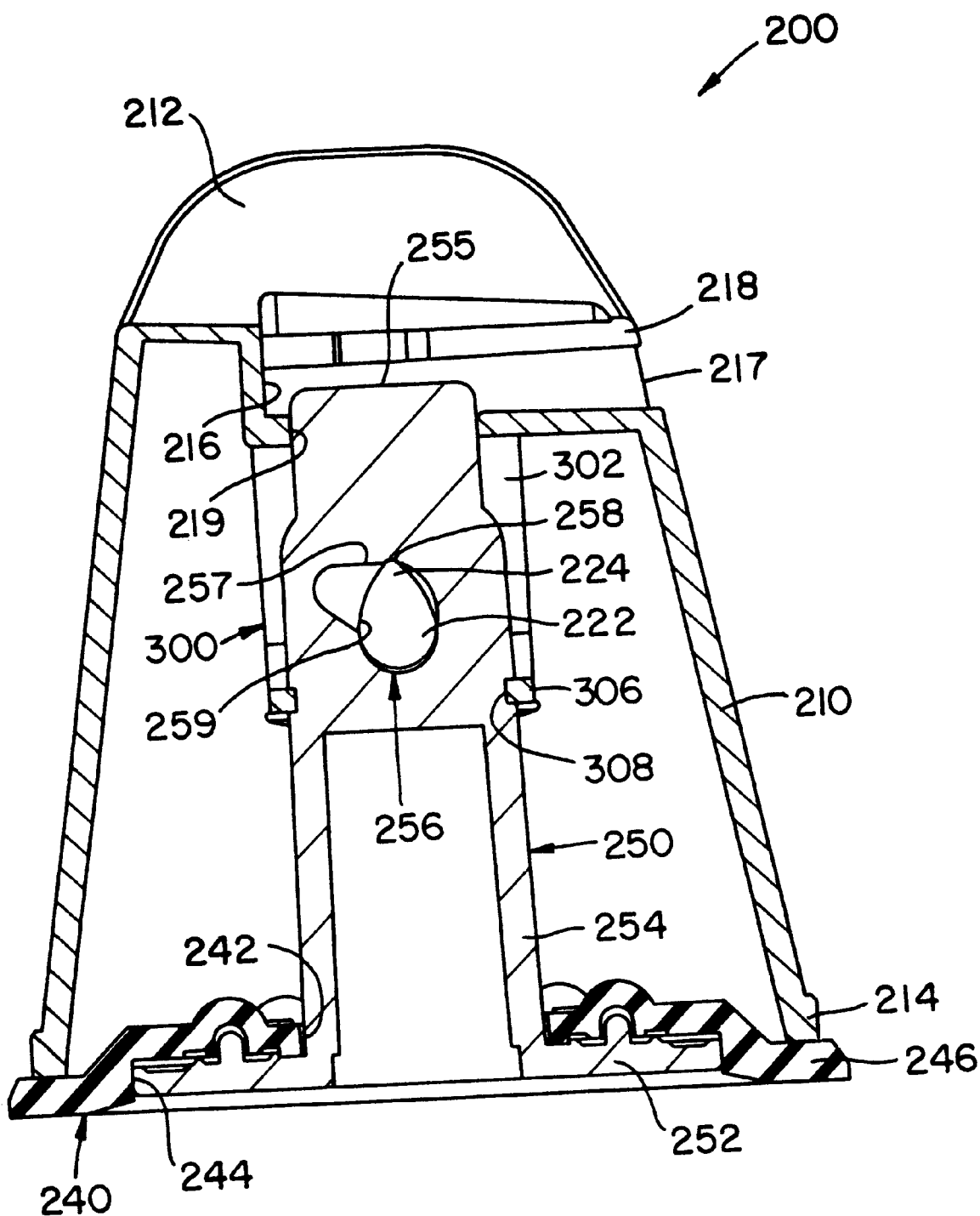
FIG. 3 is a cross-sectional front side view corresponding to FIG. 2, showing the base in a locked condition.
Figure 4:
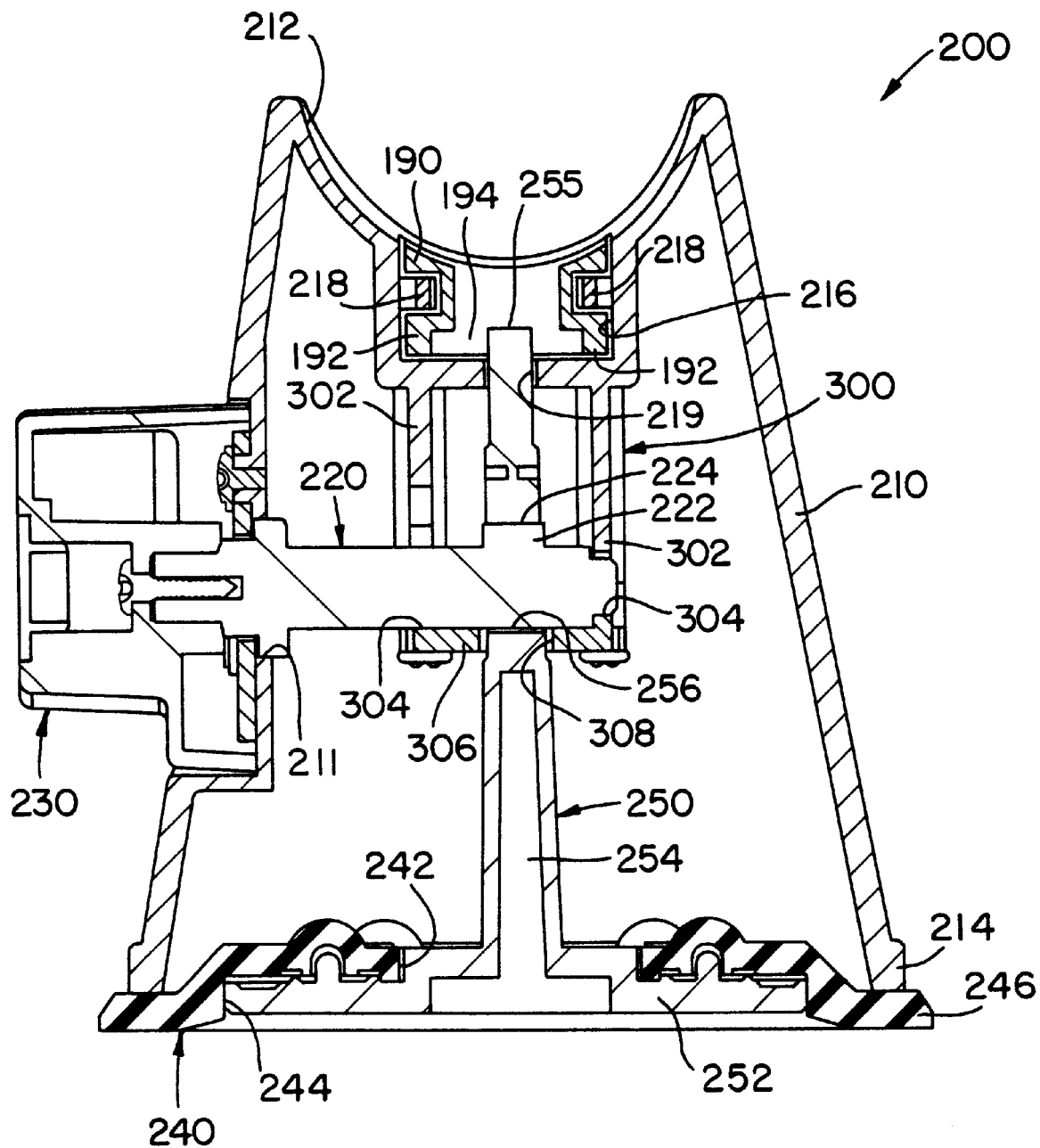
FIG. 4 is a cross-sectional right side view of the base of FIG. 3, in the same locked condition.

The locking member 250 is movable between a normal lower position (FIG. 2) and an operating upper position (FIGS. 3 and 4) relative to the base body 210. When the locking member 250 is in the lower position, the suction disc 240 is unstretched and the uppermost end 255 of the stem 254 stays wholly within the bottom slot 219 of the channel 216. Upon clockwise rotation of the shaft 220 by means of the knob 230, the cam end 224 bears against the upper side 257 of the stem aperture 256 and thus lifts the locking member 250 upwards into the upper position, said position being locked by means of the cam end 224 clicking into engagement with the detent 258.

While the locking member 250 is in the upper position, the suction disc 240 is stretched to attach the base 200, by suction, onto a support surface such as a work top surface. Also, the uppermost end 255 of the stem 254 protrudes out of the bottom slot 219 into the channel 216 for engaging with the hollow lowermost side 194 of the bottom portion 190 of the mincing unit body 110, thereby holding the mincing unit 100 in connection with the base 200 for mincing operation.

After use, the knob 230 is turned anti-clockwise to rotate the shaft 220 and hence the cam end 224 off the detent 258 of the stem aperture 256, thereby allowing the suction disc 240 to unstretch to stop the suction action for releasing the base 200 from the work top surface. Further rotation will cause the cam end 224 to bear against the pointed portion 259 of the stem aperture 256, thereby pushing the locking member 250 down into the lower position. As a result, the stem end 255 is withdrawn and the mincing unit 100 may then be separated from the base 200 for cleaning and/or storage with the base 200, etc, in a box 12.

It is envisaged that the mincing unit 100 may take the form of any other food processing unit for, as examples, food cutting, juice extraction or the like.

The invention has been given by way of example only, and various other modifications of and/or alterations to the described embodiment may be made by persons skilled in the art without departing from the scope of the invention as specified in the appended claims.

What is claimed is:

1. A food processor comprising a food processing unit and a separate base for holding the food processing unit in position for operation, the food processing unit and the base having respective portions for releasable inter-connection, the base including a bottom suction member for releasable attachment by suction to a support surface and an internal locking member movable between a first position stretching the suction member to produce suction and locking the food processing unit to the base, and a second position for releasing the suction member and the food processing unit, wherein one of the portions includes a recess for receiving the other portion to connect the food processing unit and the base together, and the locking member has a part for locking, in the first position, the other portion received in the one portion.

2. The food processor as claimed in claim 1, wherein the recess has a channel having an open end for receiving the other portion through the open end in a slide fit, the recess and the other portion having inter-engageable formations on opposite sides.

3. The food processor as claimed in claim 2, wherein the part of the locking member extends, in the first position, into the channel for locking the other portion received in the channel.

4. The food processor as claimed in claim 1, wherein the portion of the base includes the recess.

5. A food processor comprising a food processing unit and a separate base for holding the food processing unit in position for operation, the food processing unit and the base having respective portions for releasable inter-connection, the base including a bottom suction member for releasable attachment by suction to a support surface and an internal locking member movable between a first position stretching the suction member to produce suction and locking the food processing unit to the base, and a second position for releasing the suction member and the food processing unit, wherein the base includes a cam rotating to move the locking member between the first and second positions, and the locking member has an upper part for locking the food processing unit connected to the base and a lower part engaging the suction member for stretching the suction member to produce suction.

6. The food processor as claimed in claim 5, wherein the locking member includes a disc having a stem upstanding from the disc, the disc being the lower part and the stem having a free end being the upper part.

7. The food processor as claimed in claim 6, wherein the stem includes an aperture within which the cam is positioned for operation.

8. The food processor as claimed in claim 7, wherein the aperture has a detent for detaining a protruding end of the cam in order to hold the locking member in the first position.

9. A food processor comprising a food processing unit and a separate base for holding the food processing unit in position for operation, the food processing unit and base having respective portions for releasable inter-connection, the base including a bottom suction member for releasable attachment by suction to a support surface and an internal locking member movable between a first position stretching the suction member to produce suction and locking the food processing unit to the base, and a second position for releasing the suction member and the food processing unit, wherein the base includes a cam rotating to move the locking member between the first and second positions, and the base includes a shaft on which the cam is located, the shaft being rotatable by means of a turning knob located outside of the base.

10. A food processor comprising a food processing unit and a separate base for holding the food processing unit in position for operation, the food processing unit and the base having respective portions for releasable inter-connection, the base including a bottom suction member for releasable attachment by suction to a support surface and an internal locking member movable between a first position stretching the suction member to produce suction and locking the food processing unit connected to the base, and a second position for releasing the suction member and the food processing unit, wherein the food processing unit is a meat mincing unit, the meat mincing unit has a metering screw for driving meat forwards and co-operable rotary cutter and stationary apertured disc for mincing meat driven by the metering screw, the rotary cutter being rotatable with the metering screw.

11. The food processor as claimed in claim 10, wherein the metering screw has a forward end with two off-centre studs and the rotary cutter has respective holes for engaging the studs such that the rotary cutter is rotatable with the metering screw.

12. The food processor as claimed in claim 10, wherein the apertured disc is held stationary by four substantially equi-angularly spaced peripheral protrusions engaging an opening in the meat mincing unit.

* * * * *